United States Patent [19]

Sanders

[11] 4,398,742
[45] Aug. 16, 1983

[54] HINGED DRAWBAR FOR BOAT TRAILER

[76] Inventor: Robert W. Sanders, 72 Lynwood Dr., Brockport, N.Y. 14420

[21] Appl. No.: 368,883

[22] Filed: Apr. 15, 1982

[51] Int. Cl.$^3$ .............................................. B60D 1/00
[52] U.S. Cl. ............................... 280/491 B; 172/126; 172/677; 280/478 R; 280/482; 403/53
[58] Field of Search ........... 280/491 B, 491 R, 491 D, 280/488, 490, 493, 498, 499, 502, 414.1, 511, 477, 478 R, 478 A, 478 B, 479 R, 479 A, 482; 414/494, 500; 403/53; 172/126, 132, 271, 311, 456, 662, 677, 679, 680

[56] References Cited

U.S. PATENT DOCUMENTS

| | | | |
|---|---|---|---|
| 2,602,684 | 7/1952 | Pinke | 403/53 |
| 3,542,138 | 11/1970 | Fackler et al. | 172/311 X |
| 4,049,062 | 9/1977 | Rossmiller et al. | 172/132 X |
| 4,073,508 | 2/1978 | George et al. | 280/491 B X |

FOREIGN PATENT DOCUMENTS 1265590  4/1968  Fed. Rep. of Germany ... 280/491 B

Primary Examiner—Joseph F. Peters, Jr.
Assistant Examiner—Mitchell J. Hill
Attorney, Agent, or Firm—Shlesinger, Fitzsimmons & Shlesinger

[57] ABSTRACT

The tongue or drawbar of a boat trailer is severed intermediate its ends; and the cut ends are then releasably hinged together by a pair of spaced, parallel hinge pins, either of which can be withdrawn to permit the forward end of the drawbar to be swung about the remaining pin, and rearwardly into an inactive position in which it effectively shortens the overall length of the drawbar, so that the associated trailer can be readily stored in a conventional garage. The hinge mechanism comprises a pair of tubular members designed to be slid over the cut ends of the drawbar, and then to be bolted and/or welded to the associated drawbar section. Confronting ends of the hinge members have thereon two sets of cooperating hinge barrels, which releasably support the two hinge pins about spaced, vertical axes adjacent opposite sides, respectively, of the drawbar. These tubular hinge members can be manufactured in various sizes so that they can be inserted onto drawbars of the most conventional sizes, e.g. 3"×3"; 3"×4"; and 3"×5".

10 Claims, 5 Drawing Figures

HINGED DRAWBAR FOR BOAT TRAILER

BACKGROUND OF THE INVENTION

This invention relates to boat trailers, and more particularly to an improved trailer having a novel hinge device for pivotally connecting a forward portion of the trailer drawbar to a rear portion thereof, so that the overall length of the drawbar can be reduced to enable the trailer to fit within a conventional garage, or the like.

With boating becoming more and more popular, the number of small-boat owners has been on the increase. Moreover, many such owners prefer to keep their boats at or near their respective homes, when not in use. As a consequence, they frequently use conventional boat trailers not only for conveying their boats to and from launching sites, but also for storing their boats when not in use.

In most cases it is preferred to store a boat and its associated trailer indoors, such as for example in one's garage. Not infrequently, however, the trailer is too long to fit within a conventional garage. For example when the trailer is backed into the garage with the boat thereon, although the boat itself may fit within the garage, frequently the drawbar, which projects from the front end of the trailer, extends well beyond the garage door, so that is is impossible to close the door over the boat and trailer. As a consequence, in those cases the owners are often required to store their boat and associated trailer out-of-doors. This not only subjects the boat to damage by weather or vandalism, but also can prove to be an eyesore to the local community.

There are a number of prior art trailers which are of the collapsible or foldable variety, but none has addressed itself to the problem solved by applicant's invention. U.S. Pat. No. 3,989,264, for example, discloses an articulated or foldable boat trailer having a two-piece frame the two sections of which are pivotally connected together about a horizontal axis, so that the trailer can be folded substantially into half of its normal size and can be carried on an automobile when not in use. In such a collapsed condition, however, it is incapable of supporting a boat thereon.

The U.S. Pat. No. 3,979,138 discloses an adjustable trailer hitch comprising an articulated arm hinged intermediate its ends, but the arm does not form part of the trailer proper, but is adapted to be interposed between a trailer and an associated towing vehicle. U.S. Pat. No. 3,831,982 discloses a socket or ball hitch which is bolted to the front end of a trailer tongue or drawbar, but the latter is not adjustable in length in any way. The U.S. Pat. No. 3,578,190 discloses a multipurpose trailer having a telescopically adjustable tongue or drawbar, but this design permits the forward end of the drawbar to be adjusted only in the direction of the axis of the drawbar, and this adjustment is limited to the extent that any fixtures are mounted on the section of the drawbar which telescopes into the other section of the drawbar.

It is an object of this invention, therefore, to provide novel hinge means for enabling one simply to reduce the overall length of a boat trailer drawbar, when not in use, thereby to enable the trailer, with a boat supported thereon, to be stored within a conventional garage.

It is a further object of this invention to provide for a boat trailer or the like a novel hinge mechanism which can be readily incorporated in a trailer tongue or drawbar selectively to reduce the length of the latter by folding it intermediate its ends about one of two, parallel hinge axes.

Other objects of the invention will be apparent hereinafter from the specification and the appended claims, particularly when considered in the light of the accompanying drawings.

SUMMARY OF THE INVENTION

To permit reduction in the overall length of a boat trailer, the drawbar of the trailer is cut completely through at right angles to its axis adjacent the forward end of the bar; and opposite sides of the bar are then releasably hinged to each other by two pairs of cooperating hinge plates and a pair of associated hinge pins. The hinge pins extend parallel to each other about spaced, vertical axes, so that when one hinged pin is withdrawn the front end of the drawbar can be swung about the other pin into a retracted or folded position in which it extends diagonally rearwardly of the associated hinge axis, thereby effectively shortening the overall length of the drawbar. Alternatively, the other hinge pin can be removed to swing the forward end of the drawbar in the opposite direction, and again to shorten the overall length of the bar. If desired, both hinge pins can be removed completely to disconnect the front end of the draw bar from the remainder thereof. The mounting plates and reinforcing plates for the two hinges are designed to be mass produced and sold in kits, so that a respective trailer owner can adapt the hinges to his own trailer drawbar.

THE DRAWINGS

DETAILED DESCRIPTION OF THE PREFERRED EMBODIMENTS

Figure 1:
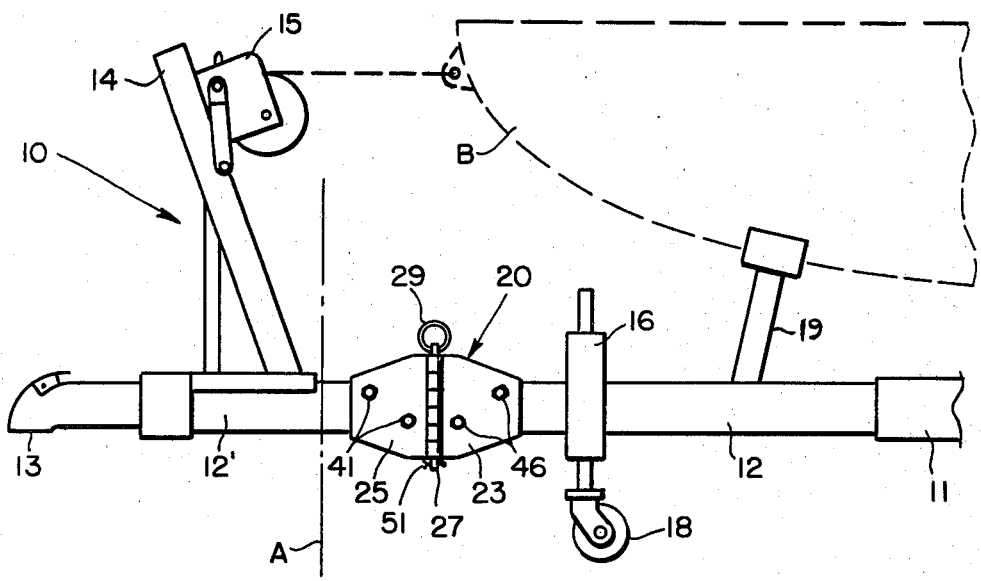
FIG. 1 is a fragmentary side elevational view of part of a boat trailer the drawbar of which has incorporated therein a novel hinge mechanism made according to one embodiment of this invention.

Referring now to the drawings by numerals of reference, and first to FIG. 1, 10 denotes generally a boat trailer having a frame 11 only the forward portion of which is illustrated. For the most part this trailer is of conventional design, and includes the usual tongue or drawbar 12, which projects centrally beyond the forward end of frame 11. Mounted on the forward end of the drawbar is the usual socket 13 for connecting the trailer to an automobile, or the like. Projecting from the upper surface of the drawbar rearwardly of socket 13 is an inclined support member 14, which carries a conventional winch 15 for drawing a boat B (broken lines in FIG. 1) onto the trailer.

Also mounted on the drawbar at a point spaced rearwardly of the winch 15 is housing 16 of a conventional, vertically adjustable wheel 18, which can be used to support the forward end of the trailer. Projecting from the upper end of the drawbar rearwardly of housing 16 is a forward boat support 19, which also is of conventional design.

In accordance with this invention the drawbar 12 is severed into two parts on a plane which extends at right angles to the axis of the drawbar, and in the embodiment illustrated at a point between the wheel housing 16 and the winch 15. In the drawings the forward end of the drawbar, the section which is denoted by the numeral 12', is releasably attached to the remaining portion 12 of the drawbar by a novel hinge mechanism which is denoted generally at 20.

Figure 2:
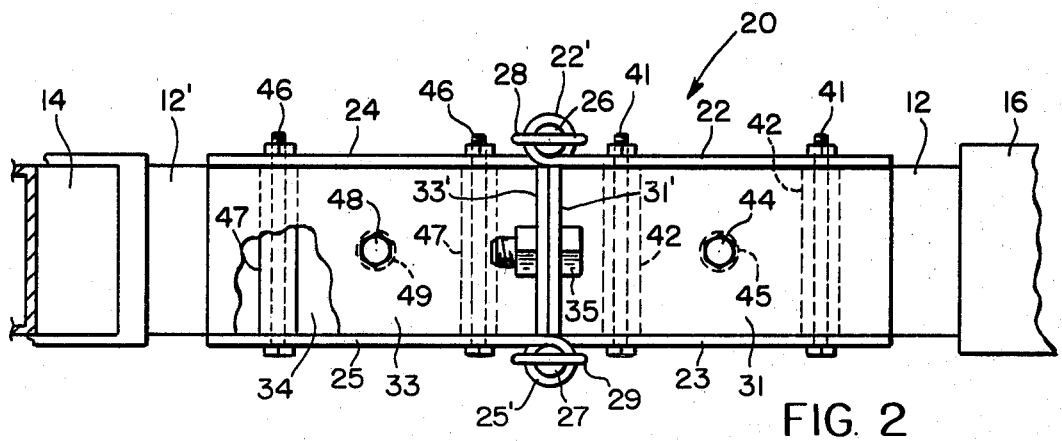
FIG. 2 is an enlarged, fragmentary plan view of the portion of the drawbar in which this novel hinge device has been incorporated.
Figure 3:
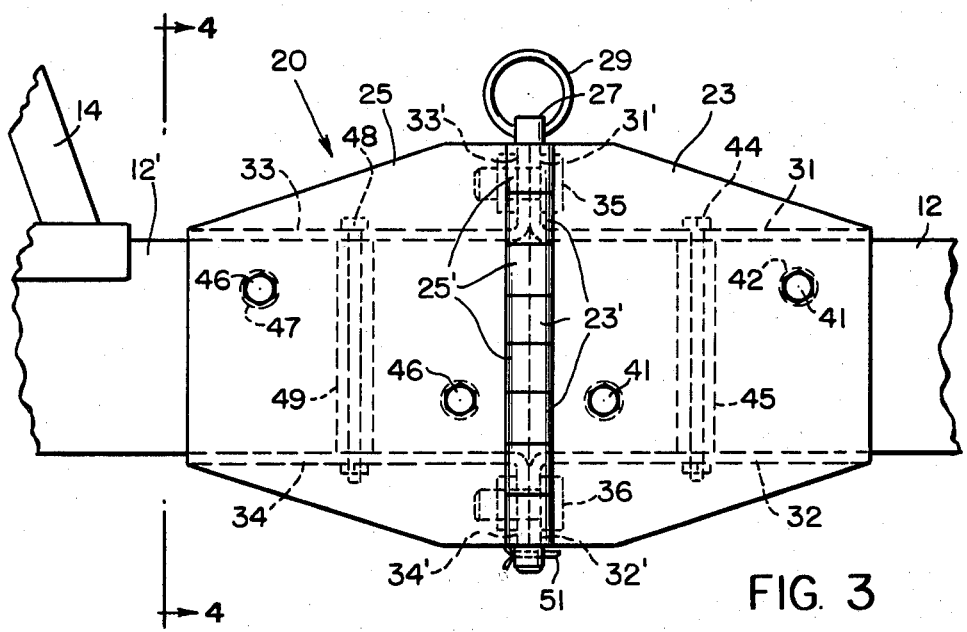
FIG. 3 is a fragmentary side elevational view of the hinge device as shown in FIG. 2.
Figure 4:
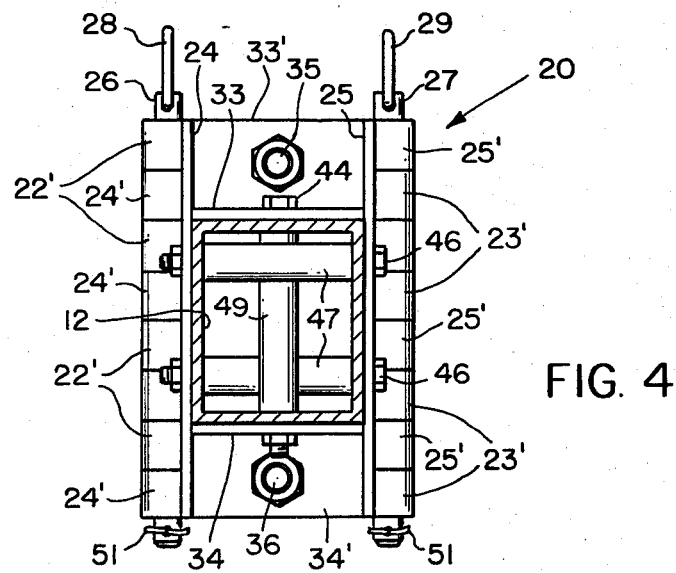
FIG. 4 is an enlarged, fragmentary sectional view taken generally along the line 4—4 in FIG. 3 looking in the direction of the arrows.

Referring now to FIGS. 2 to 4, it will be noted that the drawbar sections 12 and 12' are generally rectangular in cross section. Secured to opposite sides of the drawbar section 12 at its forward end (left end in FIGS. 2 and 3) are two hinge plates 22 and 23, which are generally similar in configuration. Along the edges thereof which register with the forward end of drawbar section 12 the hinge plates 22 and 23 have formed thereon a plurality of integral, vertically spaced, coaxially aligned barrels or pin supporting sleeves 22' and 23', respectively. These barrels may be formed in the usual manner by rolling notched portions of the respective plates 22 and 23 outwardly relative to the sides that are engaged with the drawbar section 12. Likewise, two additional hinge plates 24 and 25 are secured to opposite sides of the rear or right hand end of the drawbar section 12', and have thereon spaced barrels or pin-supporting sleeves 24' and 25' which, as shown in FIGS. 2 to 4, are disposed to mesh in a conventional manner with the barrels 22' and 23' on the registering hinge plates 22 and 23, respectively.

Normally, as shown for example in FIGS. 1 to 4, the two sets of intermeshed barrels 22', 24' and 23', 25' are releasably secured in coaxial relation by a pair of conventional hinge pins 26 and 27, respectively. Attached to the upper ends of pins 26 and 27 are conventional snap rings 28 and 29, respectively.

Overlying the top and bottom surfaces, respectively, of the drawbar section 12 between plates 23 and 22 are two reinforcing plates 31 and 32, which at one end (the left ends in FIGS. 2 and 3) have outwardly projecting, right-angular flanges 31' and 32', respectively. These flanges lie in a vertical plane coplanar with the end of the drawbar section 12' between the hinge plates 24 and 25, and likewise have at their inner ends outwardly projecting, right-angular flange sections 33' and 34', respectively, which are coplanar with the inner or right end of the drawbar section 12'. As shown more clearly in FIGS. 2 and 3, when the drawbar sections 12' and 12 are interconnected by the hinge pins 26 and 27, the outer surfaces of flanges 31' and 32' of reinforcing plates 31 and 32 are disposed in coplanar engagement with the corresponding surfaces on flanges 33' and 34' on the reinforcing plates 33 and 34. Also at such time the confronting flanges 31', 33' and 32', 34' are releasably secured together by removable bolts 35 and 36, respectively.

In practice, each hinge device 20 is designed to be made as two separate units: one unit comprising hinge plates 22, 23 secured in spaced, parallel relation by the associated reinforcing plates (or angle brackets) 31 and 32. Opposite sides edges of the plates 31 and 32 can be tack welded or otherwise secured to the hinge plates 22 and 23 to keep them separated, and to form a rectangular enclosure that is adapted to slide over the end of drawbar section 12 as noted hereinafter. Likewise, the other half or unit of the hinge device 20 would comprise the two hinge plates 24 and 25, which would be secured in spaced, parallel relation by the reinforcing plates or angle irons 33 and 34, which as in the case of the above-described unit, would be welded or otherwise secured along their longitudinal side edges to the confronting surfaces of hinge plates 24 and 25 to form therewith a rectangular opening for accommodating the rear end of the other section 12' of the drawbar.

In use, then, the unit or section of the hinge device 20 defined by plates 22, 23, 31, 32 would be slid over the end of the drawbar section 12 until flanges 31', 32' registered with the left or terminal end of this drawbar section 12. The unit would then be secured to section 12 as for example, by two, elongate bolts 41, which would pass through registering openings in the hinge plates 22 and 23, and through conventional, tubular spaces or sleeves 42 positioned in the bore of the drawbar section 12 between its sidewalls. At such time also the reinforcing plates 31 and 32 would be attached to section 12 by another bolt 44, which would be inserted through registering openings in the plates 31, 32, and the top and bottom walls, respectively, of section 12, and through a spacer sleeve 45 similar to sleeves 42. In addition to the bolts 41 and 44, of course, the unit represented by plates 22, 23, 31 and 32 could likewise be welded directly to the drawbolt section 12.

In a like manner, the unit represented by plates 24, 25, 33 and 34 would be inserted over the inner end of section 12' and then be bolted in place by bolts 46 which would extend through spacer sleeves 47 interposed between the sidewalls of the drawbar section 12'. Another bolt 48 would be inserted through a spacer sleeve 49 in section 12' to secure plates 33 and 34 to section 12'. Then to attach section 12' to section 12, the barrels on the respective hinge plates would be intermeshed as shown in FIGS. 2 and 3, after which the hinge pins 26 and 27 would be inserted releasably to secure section 12' to section 12. Thereafter the removable safety bolts 35 and 36 would be inserted through the flanges on the reinforcing brackets or plates 31, 32 and 33, 34. Also at this time conventional cotter pins would be inserted through registering openings in the lower ends of the hinge pins 26, 27 to prevent accidental removal thereof.

Figure 5:
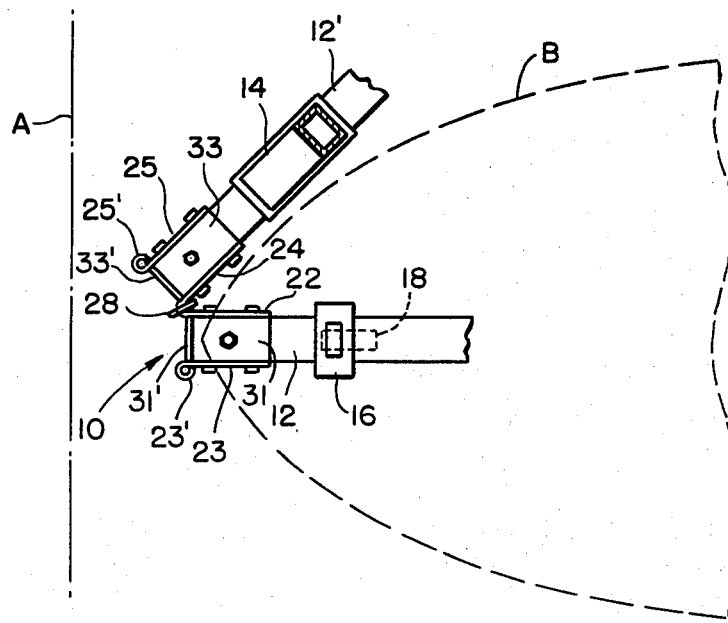
FIG. 5 is a fragmentary plan view of the drawbar and associated hinge mechanism as it appears when the forward end of the drawbar has been swung rearwardly into a folded position.

When thus assembled, the innerconnected drawbar sections 12, 12' would be as shown in FIG. 1, wherein the broken line denoted at A is intended to denote the position a conventional garage door would assume when closed. Also in FIG. 1 the position of the boat trailer and associated drawbar is intended to represent the position that the trailer and associated boat B would normally assume when the trailer has been backed into the garage as far as it will go. In such case it will be noted that the drawbar will tend to project outwardly beyond the point where the closed garage door is normally positioned. With applicant's invention it is possible to shorten the drawbar simply by pulling one of the hinge pins (for example pin 27 as shown in the drawings) and removing bolts 35 and 36, thereby leaving the forward drawbar section 12' free to pivot about the remaining hinge pin 26, and into the folded or retracted position as shown in FIG. 5. In this position it will be noted that the entire trailer and drawbar portion thereof is positioned rearwardly or to the right of the position A normally assumed by the garage door when it is closed.

It is therefore possible to close the door without experiencing any interference from the trailer.

From the foregoing, it will be apparent that the present invention provides a relatively simple and inexpensive means for reducing the overall length of a conventional boat trailer drawbar to enable the parking of the loaded trailer in a conventional garage of average size. Simply by pulling one or the other of the hinge pins 26 or 27 from the associated hinge plate barrels, it is possible to swing the forward end 12' of the drawbar rearwardly into a collapsed or folded position in which the winch 15 on the front of the trailer will be swung rearwardly toward the side of the trailer, where it will not interfere with the closing of a garage door of the type described above.

The advantage of applicant's modified drawbar, as compared for example to the above-noted telescopic type, is that it can be produced rather simply by modifying a conventional drawbar through the use of a hinge mechanism of the type denoted at 20. It would be far more difficult and complicated to convert a conventional drawbar to the telescopic type, since it would require that section 12', for example, be either larger or smaller than section 12 to permit one to telescope into the other; and if such conversion were to be made, all of the fixtures (13, 14, 15) on the original section 12' would have to be removed and rewelded or otherwise secured onto the new telescopic section 12'.

Moreover, for proper adjustment, a substantial length of the telescoping section would have to be free of any external fittings or projections so that it could slide in and out of the bore of the other section of the drawbar. No such limitation is necessary with applicant's invention because the hinge mechanism is designed to swing the foldable front section 12' about a vertical axis rather than to shift this section axially.

Most standard drawbars for boat trailers of the type described are rectangular in cross section, and generally, have one of the following three dimensions: 3"×3"; 3"×4"; or 3"×5". As a consequence, it is a relatively simple matter to make applicant's hinge mechanism in two separate parts or units, one of which, as noted above, comprises the hinge plates 22, 23 secured in spaced relation by the plates or brackets 31, 32, and the second of which comprises the hinge plates 24 and 25 interconnected by the associated brackets or plates 33, 34. The rectangular bore defined by each of the above-noted units would be dimensioned to slide over the confronting ends of a conventional drawbar after it has been severed adjacent its outer end (for example inwardly of its winch) as described above. After sliding the cooperating hinge units onto the front ends of drawbar sections 12 and 12', the respective units can then be fastened to the associated drawbar sections, as for example by the bolts 41, 44, 46 and 48, and if desired by welding the respective units to the associated drawbar sections.

It will be understood that whenever it is desired to swing section 12' of the drawbar to one of its collapsed positions, the safety bolts 35 and 36 are first removed so as to enable the front section 12' to be swung about one or the other of the hinge pins 26, 27, depending which of the latter is removed.

While this invention has been described in connection with rectangular drawbars, it will be obvious to one skilled in the art that the novel hinge mechanism 20 could likewise be adapted for use with circular drawbars. Moreover, while the invention has been described in connection with boat trailers, it will be apparent that it could be employed on any type of trailer having the usual drawbar or tongue for attachment to a towing vehicle.

Also, while this invention has been illustrated and described in detail in connection with only certain embodiments thereof, it will be apparent that it is capable of still further modification, and that this application is intended to cover any such modifications as may fall within the scope of one skilled in the art or the appended claims.

Having thus described my invention, what I claim is:
1. An improved trailer, comprising
   a frame,
   a trailer drawbar projecting from said frame and being cut intermediate its ends into two separate sections,
   hinge means releasably securing the cut end of said one section of said drawbar to the cut end of the other section thereof, and operative to permit pivotal movement of said other section selectively into and out of an operative position in which it registers axially with said one section to form an extension thereof, and
   coupling means on the opposite end of said other section for releasably connecting the trailer to a towing vehicle, when said other section is in its operative position,
   said hinge means comprising two separate hinge pins both of which can be removed completely to disconnect said other section from said one section of the drawbar, and one of which can be removed to permit said other section to be swung about the other hinge pin to an inoperative position in which said other section is folded rearwardly to a collapsed position in which said coupling means is positioned rearwardly of said opposite end of said one section.
2. An improved trailer as defined in claim 1, wherein said hinge pins lie on spaced, parallel, vertical axes when said other section is secured in its operative position.
3. An improved trailer as defined in claim 1, wherein said hinge means further comprises
   a first pair of hinge plates secured to opposite sides of said one drawbar section and each having thereon a set of spaced barrel sections which register with said cut end of said one section, and
   a second pair of hinge plates secured to opposite sides of said other section and each having thereon a set of spaced barrel sections disposed to mesh with a corresponding set of barrel sections on said first set of hinge plates, when said other drawbar section is in its operative position, and
   said hinge pins being releasably mounted in said intermeshed barrels adjacent opposite sides of said drawbar thereby hingedly to connect said first pair of hinge plates to said second pair thereof, when said other drawbar section is in its operative position.
4. An improved trailer as defined in claim 3, including
   a pair of reinforcing plates secured to the top and bottom surfaces of each of said drawbar sections between the associated pair of hinge plates, each of said reinforcing plates having a right angular flange section projecting outwardly from the associated drawbar section adjacent its cut end, and disposed to register with a corresponding flange on one of the other pair of reinforcing plates, when said other section is in its operative position, and a bolt for releasably securing together said registering flanges of each pair of said reinforcing plates.

5. An improved trailer as defined in claim 1, wherein said hinge means further comprises a first tubular device secured over said cut end of said one section, a second tubular device secured over said cut end of said other section, and each of said devices having formed on one end thereof two sets of spaced, coaxial barrels which register with opposite sides of said drawbar sections adjacent the cut ends thereof, the two sets of barrels on one of said devices being pivotally connected by said hinge pins with the two sets of barrels on the other of said devices.

6. An improved trailer as defined in claim 5, wherein said two hinge pins are supported in spaced, parallel relation by said barrels on said tubular devices, when said other section is in its operative position.

7. A device for use in hingedly connecting together the two, complimentary, cut ends of a trailer drawbar, which has been cut intermediate its ends for the purposes of selectively reducing the overall length of the drawbar for storage purposes, comprising a pair of tubular hinge members, each having a bore that is similar in cross sectional configuration to, and slightly larger than, the cut ends of said drawbar, whereby each member is slidable at one end over one of said cut ends of the drawbar, each of said pair of hinge members having formed on the opposite end thereof two sets of spaced, coaxially disposed hinge barrels, one of which sets is disposed coaxially of a first axis that extends normal to the axis of said bore adjacent one side of the associated member, and the other set of which is disposed coaxially of a second axis which extends parallel to said first axis adjacent the opposite side of the associated member, the two sets of hinge barrels on one of said members being similar to and axially offset slightly relative to the two sets of hinge barrels on the other of said members, whereby each set of hinge barrels on said one member is disposed operatively to mesh with a corresponding set of barrels on said other member thereby to form two hinge pin bores adjacent opposite sides, respectively, of said members, and, a pair of hinge pins insertable into said hinge pin bores releasably to connect together said hinge members.

8. A device as defined in claim 7, wherein each of said hinge members is generally rectangular in cross section, said first and second axes extend parallel to a first pair of opposed, parallel side walls of a respective hinge member, and each of said members has on said opposite end thereof a pair of right-angular flange sections which project outwardly from the other pair of opposed side walls of a respective hinge member and transversely of the two sets of hinge barrels on the last-named member.

9. A device as defined in claim 8, wherein on each of said members the outer surfaces of said flange sections lie in a common plane normal to the axis of the bore in said member, and said first and second axes lie in said common plane, whereby when said members are connected by said hinge pins said outer flange surfaces on one of said members is disposed in confronting, substantial coplanar engagement with the outer flange surfaces on the other of said members.

10. A device as defined in claim 9, wherein each of said flange sections has at least one opening therethrough for accommodating the shank of a bolt.

* * * * *